United States Patent [19]

Mehta et al.

[11] 4,427,629
[45] Jan. 24, 1984

[54] PROCESS FOR METAL-ENRICHMENT OF LEAD BULLION

[75] Inventors: Jitesh R. Mehta; Andrew H. Larson, both of Eagan, Minn.

[73] Assignee: GNB Batteries Inc., Mendota Heights, Minn.

[21] Appl. No.: 444,259

[22] Filed: Nov. 23, 1982

[51] Int. Cl.$^3$ .................... C22C 11/00; C22C 11/04; C22C 11/06; C22C 11/08

[52] U.S. Cl. .................................. 420/563; 420/566; 420/570; 420/572; 420/573; 420/575

[58] Field of Search ............... 420/563, 564, 566, 572, 420/573, 574, 575, 571, 569; 75/24, 78

[56] References Cited

U.S. PATENT DOCUMENTS 1,500,954  7/1924  Mathesius et al. ................. 420/564
1,786,908  12/1930  Hanak ..................................... 75/63

OTHER PUBLICATIONS

Recovery of Metals from Semifinished Lead Refinery Products, Pajak, Irena; Bojanowska, Anna; Lach, Ewa, Pr. Inst. Met. Niezelaz, 1973, 2(4), 175–181, (Poland), (Abstract).

Primary Examiner—M. J. Andrews
Attorney, Agent, or Firm—Augustus J. Hipp

[57] ABSTRACT

A process for metal-enrichment of lead bullion, wherein an alkali metal-desired metal intermetallic, such as sodium-antimony intermetallic, is added as a refining dross to the bullion and the desired metal is stripped from the dross and recovered as an enriched bullion. The process includes the steps of heating the lead bullion, in which the desired metal is to be recovered, to a temperature between 650° F. and 900° F.; agitating the molten bullion; adding said alkali metal-desired metal intermetallic to said bullion; mixing said intermetallic into said bullion; adding a stripping reagent for stripping said desired metal from said intermetallic; forming a desired metal-enriched lead bullion and a residue dross substantially void of said desired metal; and separating said enriched bullion from said residue dross. The process may also require a cleansing step to cleanse said enriched lead bullion of any said alkali metal in solution. Through the control of temperature, additions of stripping and cleansing reagents and agitation, the process provides economies of materials, energy, time and labor over conventional metal recovery processes.

23 Claims, No Drawings

PROCESS FOR METAL-ENRICHMENT OF LEAD BULLION

CROSS-REFERENCE TO RELATED APPLICATION

Mehta et al, U.S. Ser. No. 444,258, filed on even date herewith, for: An Improved Refining Process for Removing Antimony from Lead Bullion.

TECHNICAL FIELD

This invention relates to a process for recovering in lead bullion desirable elements contained in the drosses from lead refining operations in which alkali metals are used as refining reagents.

BACKGROUND ART

The conventional refining of lead results in the concentration of antimony and other elements, usually as oxides in the refining dross or slag, separable from the refined lead bullion. These elements, along with considerable amounts of lead, present as oxides in the refining drosses, are of value and are normally recovered.

The conventional method used to recover lead, antimony and other elements present in the refining drosses usually includes processing these drosses through a smelting operation. Typically, such smelting operation utilizes a blast furnace where the refining drosses and other lead bearing materials are first mixed with coke, limestone and iron and charged into the furnace. At smelting temperatures of 2000° to 2500° F. (1121° to 1371° C.), the lead bearing materials are smelted and the oxides are reduced by the coke to produce metallic lead bullion containing most of the other valuable elements from the refining drosses. The limestone and iron serve as flux to form a slag substantially void of lead and other elements of value.

The recovered lead, including the other elements of value recovered therein, is further utilized in refining processes to make desired alloys. During this further refining process, any undesirable elements present are again oxidized and form refining drosses which are recycled through the smelting operation to recover the lead and the other elements. The recycling of the dross, containing undesired alloying elements, is usually continued until the amount of dross and the processing thereof become uneconomical to process further. The dross is then removed and stored until the alloying elements therein are needed for making desired alloys or is otherwise disposed of which may incur substantial expenses. This entire dross recycling operation is costly and the cost increases proportionately with the number of cycles involved.

In another method, as taught by Hanak in U.S. Pat. No. 1,786,906, an alkali metal process is used to form a slag consisting of caustic soda-sodium antimony alloy melt. To recover the antimony, the slag is cooled and treated with water to dissolve the caustic soda and react with the sodium in the sodium antimony compound to form the hydroxide. The antimony is liberated in the metallic state. The caustic solution is decanted, filtered, evaporated and recovered as dry caustic soda for reuse.

In another process, the recovery of metals from semi-finished lead refinery products is described in *Pr. Inst. Met. Niezelaz*, 1973, 2(4), 175-81 (Pol). Indium, tin and antimony are recovered from dross, obtained during the first stage of lead smelting, of the composition lead 70, copper 3.14, zinc 8.4, tin 1.7, antimony 1.0, arsenic 0.45, [sic] zinc 0.04, and silver 0.015%. The dross is melted at 1213°-1372° K. (1724° F., 940° C.-2010° F., 1099° C.) with 6% coke and 6% $Na_2CO_3$ flux. The lead is refined with 5% KOH and 2% $KNO_3$ at 693°-723° K. (788° F., 420° C.-842° F., 450° C.) and the slag is leached alternately with alkali and acid. It is possible to recover 68% indium, 73% tin and 75% antimony.

All of the above prior art processes have shortcomings in that they are highly inefficient either in materials utilization and/or time (labor) and energy consumption as compared with the process of the present invention which recovers substantial amounts of lead, antimony and other elements contained in the refining dross, incurring significantly less material, labor and fuel costs.

SUMMARY OF THE INVENTION

The present invention provides an energy, labor and material efficient process for the recovery of a desired metal, such as antimony and other metallic elements from lead refnining drosses generated by the use of sodium and other alkali metal processes for the refining of lead bullion. The refining drosses processed by the present invention may be produced by the processes described in greater detail in the above cross-referenced Mehta et al co-pending U.S. Ser. No. 444,258, assigned to the same assignee as this application, and which is hereby incorporated by reference and made a part of this application.

While the present invention is susceptible of various modifications and alternative forms, specific embodiments thereof are described in detail herein. It should be understood, however, that it is not intended to limit the invention to the particular embodiments or forms disclosed, but, on the contrary, the intention is to cover all modifications, equivalents, and alternatives falling within the spirit and scope of the invention as expressed in the appended claims. Thus, for example, while the present invention will be principally described in connection with the use of drosses obtained from a refining process which employed sodium as the refining reagent, it should be appreciated that such refining process may have used any alkali metal as the refining reagent as drosses obtained from refining processes employing such other alkali metal refining reagents work equally well in the process of the present invention.

The present invention is intended for use either as a batch or continuous process in recovering substantially all antimony, as well as other valuable elements, from the refining drosses resulting from lead bullion refining using alkali metals as refining reagents.

Broadly, the present invention comprises treating the refining drosses resulting from the refining of lead bullion using alkali metal as the refining reagent; however, for a clearer understanding, the present invention is described using refining drosses resulting from the refining of lead bullion in which sodium is used as the alkali metal refining reagent. The refining process includes initially heating, by conventional heating means, an antimony-containing lead bullion in a refining vessel to a temperature of about 25° F. (14° C.) above the melting temperature of the bullion. The heating is then discontinued as all further heating of the bullion is accomplished by exothermic chemical reactions between metallic sodium and the antimony in the lead bullion and the heat of solution from sodium going into solution in the bullion. The molten lead bullion is agitated to develop a strong vortex. Caustic soda, also referred to herein as "caustic," is then added to the bullion where it melts and is mixed with the bullion. Metallic sodium, as the refining reagent, is then added directly to the vortex where it melts and is thoroughly mixed into the bullion. Upon addition of sodium, it reacts with the antimony in the bullion to form a sodium-antimony intermetallic. Along with the antimony, other common elements, such as arsenic, cadmium, copper, nickel, silver, sulfur, selenium, tellurium and zinc, commonly present in secondary lead bullion, are also removed to some extent. These elements react with the sodium to form intermetallics or compounds. A limited amount of tin is also removed with the antimony, depending upon the extent of agitation and the amount of caustic soda added. After the refining reactions have been accomplished, the agitation is stopped. In the presence of the caustic soda added, the sodium-antimony intermetallic separates from the bullion and an antimony-rich refining dross in the form of a black, soft, sticky and chunky skimmable dross rises to the surface of the molten bullion. Along with the antimony, any of the aforementioned elements present in the initial bullion are also recovered in the refining dross. This dross is removed and stored separately for further treatment in accordance with the present invention. The term "skimmable" as used herein refers to a dross which, because of its consistency and high viscosity, is easily removed from the molten bullion surface using conventional skimming equipment.

The partially refined molten bullion is then ready for further sodium refining treatment, or, if the antimony content has been reduced to the desired level, then the bullion is ready for cleansing of residual sodium remaining in solution.

Upon each addition of metallic sodium, the temperature of the bullion increases by an amount which is dependent upon the extent of sodium burning, the sodium-antimony reaction and the sodium going into solution in the lead and it may be necessary to cool the bullion from time to time in order to maintain the operating temperature below 800° F. (427° C.). Subsequently, after the refining operation is completed, the bullion is cleansed of remaining sodium, as hereinafter described.

The bullion cleansing step or operation is performed as close as possible to the bullion melting temperature, using oxidizing cleansing reagents, such as water, oxygen-enriched air or nitre, or elemental cleansing reagents, such as sulfur, selenium, tellurium, phosphorus, chlorine or mixtures thereof. By the use of oxidizing cleansing reagents, the oxygen present in such reagents reacts with the sodium present in the bullion to form sodium oxides and hydroxides which form a skimmable cleansing dross which can be easily skimmed from the bullion. The cleansing elements, such as sulfur, selenium, tellurium, phosphorus, chlorine and mixtures thereof react with the sodium to form compounds which separate, rise to the surface of the bullion as a skimmable dross which can easily be skimmed.

By using said refining process, along with the antimony removal, the process also substantially removes other elments such as arsenic, copper, cadmium, nickel, silver, sulfur, selenium, tellurium and zinc in one operation.

The metallic sodium can be added in the form of solid bricks or liquid. If added as bricks, the sodium should be added, one brick after another, to the vortex of the agitated bullion, as contrasted to addition of large quantities which results in loss of sodium due to burning. The presence of a strong vortex is essential for rapid mixing of the sodium into the bullion. Thus, the sodium bricks are added one after another as soon as the fire from the previous brick has subsided. If the sodium is to be added in liquid form, the molten sodium is pumped directly under the surface of the bullion during agitation.

As observed from refining experiments, the ratio of caustic to sodium added should generally be within the range of 1:15 to 1:4, or stated in terms of caustic added to antimony removed the ratio should be between 1:75 to 1:2. Further, the ratio of antimony removed to sodium added should generally be within the range of 5:1 to 0.5:1.

It should be emphasized that while using said sodium refining process, close watch must be maintained on the bullion temperature as each sodium addition to the bullion causes the temperature of the bullion to increase due to the exothermic nature of the chemical reactions involved. When the bullion temperature increases in excess of 750° F., the sticky and chunky antimony-rich dross becomes very liquid, i.e. having a low viscosity, and is very difficult to skim. Care should be exercised during the process to permit the bullion to cool if necessary. Also, caution should be exercised as no water should be used to induce such cooling, because the water will react with the sodium in the sodium-antimony intermetallic to strip the antimony already collected in the dross and return it to the bullion. In order to avoid excessive heating of the bullion, i.e. over 750° F., during the process, the starting bullion temperature should be limited to a maximum of 600° F. to 650° F.

While using said lead refining process, the antimony-rich dross should be skimmed after every 600 pounds (or as deemed by observation of the operator to be appropriate) of sodium addition in order to avoid excessive accumulation of dross which will inhibit the mixing operation. Significant dross accumulation (i.e. a dross thickness in excess of about 4 in. thick over the entire bullion surface) may freeze into a hard crust when allowed to settle and become difficult to skim effectively.

In the process of this invention, the aforementioned lead refining drosses are treated to recover the lead, antimony and other valuable elements present in the dross. Experimentally, the refining drosses typically have been analyzed to contain about 30 to 45% lead, 15 to 30% antimony, and the remainder consisting of other elements, sodium and caustic soda. Among the other elements typically present in the refining drosses are arsenic, cadmium, copper, nickel, silver, sellenium, sulfur, tin, tellurium and zinc. The antimony and most of these other elements are present as either sodium intermetallics or compounds in the refining drosses. Most of the lead in the dross is present as entrapped lead.

In practicing this invention, the refining drosses to be added to the lead bullion to be enriched should be selected to ensure that the quantity of the desired metal in such refining drosses is sufficient to accomplish the required bullion enrichment. The refining drosses containing sodium-antimony intermetallic, herein broadly referred to as "alkali metal-desired metal intermetallic," are added to a kettle of molten lead bullion in which the antimony, as the desired metal, is to be recovered. The bullion is maintained between 650° to 900° F. (343° to 482° C.) and is vigorously agitated to pull the dross into the vortex to mix well with the lead bullion. During this mixing, antimony stripping reagents are added to the bullion. The stripping reagents react with the sodium present in the intermetallics in the dross to form sodium compounds, thus stripping, i.e. liberating, the antimony and other elements present in the intermetallics. As used herein, the term "stripping reagent(s)" means any element or compound which, when added to molten lead bullion containing an intermetallic comprising an alkali metal and one or more metals of antimony, cadmium, copper, nickel, silver, selenium, tin, tellurium and zinc, said stripping reagent reacts with said alkali metal to thereby release or liberate the other metal or metals of said intermetallic into said molten lead bullion.

Broadly, the temperature of this process is desirably between 650° to 900° F. At temperatures lower than this, a considerable amount of time is consumed in remelting the solidified dross, while at temperatures in excess of this, a considerable amount of the elements to be recovered may be oxidized. Also, at such higher temperatures, the liberated sodium has an increased tendency to go into solution in the lead bullion rather than form compounds with the stripping reagents, which in turn results in excessive costs in cleansing the bullion.

The vigorous agitation of the bullion during this process is essential. During the formation of the sodium-stripping reagent compounds to thereby liberate the valuable elements, such as antimony, the bullion should be mixed well to dissolve promptly the liberated elements to prevent their oxidation and subsequent loss. These liberated elements, being in nascent condition, are very susceptible to oxidation in the presence of oxygen (exposure to air) at these temperatures.

Oxidizing stripping reagents which may be used in this process are air, oxygen-enriched air, water (including steam), nitre and other acceptable oxidizing reagents. Stripping elements such as sulfur, selenium, tellurium, phosphorus, chlorine and mixtures thereof may also be used to form sodium compounds and, in the process of forming such compounds, liberates the valuable antimony for recovery. The sodium, having a higher affinity for the elements sulfur, selenium, tellurium, phosphorus and chlorine, releases the antimony and combines with said elements to form sodium compounds. These compounds combine with the caustic soda in the refining drosses to form a very lightweight, grayish-black skimmable dross, hereinafter referred to as "residue dross." This residue dross is substantially void of entrapped lead, contains very small amounts of valuable elements and comprises 25 to 35% by weight of the refining drosses treated.

During the antimony liberation and recovery process, sodium also reacts with any arsenic, sulfur, selenium and tellurium present in the bullion to form compounds as the result of the high affinity of sodium for such elements. These compounds are also accumulated in the residue dross. Thus, these reactions refine the bullion simultaneously with the antimony enrichment.

As stated above, during the valuable elements recovery process, the sodium is also likely to go into solution in the bullion. The bullion must be cleansed of this sodium in solution to a final sodium concentration not in excess of 0.002% by weight. This cleansing operation is performed by mixing into the bullion cleansing reagents such as water, sulfur, selenium, tellurium, phosphorus, chlorine and mixtures thereof.

Using the process of this invention, 70 to 90% of the lead and antimony in the refining drosses are normally recovered in the lead bullion. Significant amounts of cadmium, copper, nickel, silver and tin present in the refining drosses are also recovered in the lead bullion. The extent of recovery of these elements is dependent upon the following process parameters: (a) temperature being in the range of 650° to 900° F., (b) agitation being strong, but not violent (i.e. no splashing) and (c) the quantity of stripping reagents being optimized to achieve the desired reactions. Under these operating conditions, oxidation loss of these elements is limited and recovery of the valuable elements is maximized. The percentage of antimony recovery has been observed experimentally to vary, normally between approximately 70 to 90%, but may be as high as about 97%, indicating that the process parameters cannot consistently be optimized to result in the highest recovery of antimony.

The physical characteristics of the residue dross are dependent upon the antimony stripping reagents used in treating the refining drosses. When water is used as the stripping reagent, the residue dross is lightweight and very fluffy and, within approximately 15 to 30 minutes of water addition, solidifies into a porous skimmable cake. The use of other stripping reagents results in the residue dross being lightweight, dry or sticky and skimmable. The physical characteristics of the residue dross are dependent upon the operating temperature and the amount of caustic soda present in the refining drosses. If the process temperature exceeds about 850° F., or if an excessive amount of caustic soda is present, the residue dross is very liquid (i.e. low viscosity) and difficult to skim, in which event, quicklime is added to dry the dross and facilitate skimming.

In general, significant advantages are realized by the present process over conventional recovery processes by recovering lead, antimony and other valuable elements present in refining drosses without having to process such drosses through a smelting furnace, such as a blast furnace. Elimination of the smelting operation results in significant and unexpected reductions in the costs and amount of smelting reagents required. Also, since the process of this invention is operated at temperatures between 650° and 900° F., significant enery savings are realized as compared to energy consumption in typical smelting operations where operating temperatures are normally in the range of 2000° to 2500° F. Further, no appreciable amounts of lead, antimony or other valuable elements are lost in the residue drosses as are normally lost in conventional smelting processes. In addition, the present process reduces the process time required for recycling the refining drosses to recover the lead, antimony and other valuable elements.

No capital investment is required for equipment in the present process, whereas significant capital investment is required for the equipment used in the water leaching treatment of the prior art alkali metal process for recovering antimony. Such alkali metal process also requires a significant capital investment for pollution control equipment for cleansing the lead, antimony and caustic contaminated water resulting from the leaching treatment to meet the requirements of the Environmental Protection Agency prior to discharge, whereas the process of the present invention is, environmentally, substantially non-polluting.

BEST MODE FOR CARRYING OUT THE INVENTION

In practicing the present invention, the refining drosses to be treated are, in most situations, difficult to accurately analyze. In order to determine the quantity of antimony present in the refining drosses, the most practicable method for such determination is by knowing the source of the refining drosses and the analysis of the associated bullion refining results. From such data, the antimony content of the refining drosses may be approximated. Based upon such knowledge of the dross or such approximation, the antimony content of the starting lead bullion in which the antimony is to be recovered, the final required antimony content of the bullion, and the anticipated percentage of antimony recovery, calculations are made to determine the quantity of refining dross to be added to the bullion for treatment.

The preferred method of practicing the process of the present invention includes the steps of charging into a refining vessel a lead bullion having a known antimony content and in which antimony from the refining dross being treated is to be recovered, heating said bullion to a temperature between 650° to 900° F., more preferably between 750° to 850° F. (399° to 454° C.), agitating said bullion to obtain a vigorous mixing action, adding a precalculated quantity of refining dross containing a known or approximated antimony concentration, mixing said dross into said bullion, adding antimony stripping reagents comprising water, or sulfur, or a combination of sulfur and water, mixing said reagents into said bullion, discontinuing said agitation to permit the antimony-enriched bullion to settle and allow the resultant residue dross to rise to the bullion surface, skimming or otherwise separating said residue dross from said enriched bullion, and, if required, cleansing said enriched bullion to remove any sodium remaining in solution, as is hereinafter set forth in greater detail.

More specifically, the preferred embodiment includes heating the starting bullion in the refining vessel to the process temperature of between 650° to 900° F., more preferably between 750° to 850° F. At temperatures less than about 650° F., a considerable amount of time will be used in melting the refining dross to be treated after its addition to the molten bullion. At temperatures in excess of about 900° F., significant amounts of the valuable elements to be recovered are prone to oxidation in the presence of the oxidizing stripping reagents and thus lost, i.e. not recovered in the bullion. Also, at such higher temperatures, more of the sodium has a tendency to go into solution in the molten bullion rather than form compounds, thereby resulting in excessive costs for cleansing the bullion. Further, considerable amounts of the stripping reagents may be lost due to reagent burning at such higher temperatures.

The molten bullion is agitated to develop a vigorous mixing action. Such agitation is essential to thoroughly mix the refining dross into the bullion upon the addition of said dross to the bullion. This mixing results in the valuable elements in said dross being readily dissolved into the bullion when liberated from the sodium intermetallics in the refining dross by the addition of the process stripping reagents.

Preferably, the refining drosses to be treated are obtained, while still hot, and in the semi-solid state, directly from a refining process and are added while still hot to the recovery process of the present invention. The addition of said refining drosses, while still hot, contributes considerable savings in both time and energy utilized in melting and mixing said refining drosses into said bullion. If on the other hand, however, the refining drosses are to be added in the cold solidified state, the drosses preferably should first be broken into chunks of approximately twelve inches or less in diameter prior to addition thereof to the bullion. The addition to the bullion of larger dross chunks tends to impair the mixing action and increases the dross melting time.

After the refining drosses are melted and thoroughly mixed into the bullion, and with agitation continuing, the stripping reagents, preferably water, or sulfur, or a combination of water and sulfur, are added. The preferred reagents are based upon material cost economics; however, other stripping reagents, such as air, oxygen-enriched air, steam, nitre, selenium, tellurium, phosphorus, chlorine, and mixtures thereof, may be utilized and may be preferred under circumstances which justify their use. Factors which should be considered in selecting the reagent are reagent availability, ease of handling the reagent, speed of reaction, bullion contamination, and potential toxicity of evolved gases.

Upon addition of water as the preferred stripping reagent, in the form of a fine spray, the water reacts with the sodium to form sodium hyroxide. Sulfur, when utilized, reacts with the sodium to form sodium-sulfur compounds such as sodium sulfide. The use of a mixture of water and sulfur results in a combination of the aforesaid reactions. When added as a water-sulfur mixture, the fine spray of water significantly reduces the amount of sulfur lost due to burning. Caution should, however, be exercised in the amount of water used with sulfur as excess water may result in the formation of sulfurous-/sulfuric acid with its attendant hazards. Proper ventilation is essential for removal of any hazardous gases generated in order to ensure a safe working environment. The reaction compounds, in the presence of caustic in the refining dross, form a skimmable residue dross which is substantially void of entrapped lead and contains very small amounts of antimony and other valuable elements.

The agitation is discontinued when the antimony recovery reactions have been completed. Such completion is determined by visual observation of the reduction of the amount of residue dross to about one-third of the initial refining dross added and, after settling for about 15 minutes, the final residue dross is very lightweight, grayish-black and skimmable. If, after settling, the dross is observed not to have the aforesaid physical characteristics and is dark black and heavy, then agitation is resumed and additional stripping reagent or reagents are added. If the residue dross has a low viscosity and is, therefore, not skimmable, due to excess caustic present in the refining dross or generated during the antimony recovery reactions, quicklime is added in sufficient amounts to form a skimmable residue dross.

The residue dross is skimmed and is stored for subsequent use.

The bullion is analyzed, and if the sodium content is in excess of 0.002% by weight, the bullion is cleansed of the excess sodium in solution. This bullion cleansing step or operation is performed preferably as close as possible to the bullion melting temperature and preferably by adding the cleansing reagents sulfur and water simultaneously. The sulfur reacts with the sodium in solution in the bullion to form sodium-sulfur compounds. The water reacts with the sodium in solution to form sodium hydroxide. The aforementioned compounds to form a skimmable cleansing dross which is skimmed.

The use of low temperature in the cleansing operation is for the purposes of limiting loss of the cleansing reagents through evaporation or burning and reducing the solubility of sodium in the bullion thereby making the sodium easier to remove.

The process of the present invention may be utilized for the recovery of valuable elements contained in drosses resulting from any alkali metal refining process; however, the preferred drosses are those resulting from the lead refining process using metallic sodium as the refining reagent generally described above and more specifically in the aforementioned cross-referenced Mehta et al co-pending application.

The preferred embodiment is exemplified in the following examples:

EXAMPLE I

Forty-one hundred pounds of refining dross resulting from a lead refining process, using sodium as the refining agent, was treated by the process of the present invention to recover the antimony contained in the refining dross. From the results of the refining process, the antimony content of the refining dross was calculated to be about 18.5%.

Approximately 48 tons of 4.15% antimony-lead bullion in which the antimony from the above refining dross was to be recovered, was heated to 850° F. The goal of the antimony recovery process was to maximize the amount of antimony recovery from the refining dross. The dross, in solid, optimum-size chunks of approximately 12 inches, or less, in diameter, was added slowly, i.e. in small increments, depending upon the rate of dross melting and mixing into the bullion. After the dross was melted and during the mixing thereof into the bullion, water was added as an oxidizing stripping reagent to oxidize the sodium of the sodium-antimony intermetallic in the refining dross and subsequently strip and liberate the antimony to be recovered in the bullion. The water was added initially as wetted charcoal, wherein 100 pounds of granular charcoal was thoroughly soaked with water prior to addition to the molten bullion. The charcoal serves merely as a carrier for the water and does not participate directly in the antimony recovery reactions. The wet charcoal was mixed into said bullion, thereby bringing the water into direct contact with the sodium-antimony intermetallic where the water reacted with the sodium to form sodium hydroxide and stripped or liberated the antimony into the bullion for recovery. Subsequent water addition, in the form of a very fine spray, was commenced promptly upon the addition of the wet charcoal. The addition of water in the form of a fine spray prevents hot water and hot lead from splashing upon the operator, and forms a uniform spray across the surface of the bullion. This uniform spray wets the charcoal which is mixed into the bullion where the water reacts to liberate additional antimony. This wetting-antimony liberating reaction-wetting cycle was repeated until the resultant residue dross was observed to have the above described physical characteristics, namely very lightweight and grayish-black. At this point, the water spray and mixing was discontinued. The residue dross was allowed to settle. A skimmable crust was formed and skimmed.

The above described antimony recovery process was completed in only 45 minutes, including the time required to melt the refining drosses, but not including the time required for skimming the residue dross.

After the skimming step was completed, the amount of antimony-enriched bullion was approximated to be 49 tons, using a volumetric measure. The enriched bullion was analyzed and found to contain 4.82% antimony and less than 0.002% sodium. The increase of the antimony content in the bullion, from 4.15 to 4.82%, indicated a 97.5% recovery of the antimony present in the refining dross. The amount of antimony recovery from the refining dross was unexpectedly high as in previous experiments recovery did not exceed approximately 90%. Also, since the bullion contained less than 0.002% sodium, the cleansing step was not required.

In addition to recovering the antimony, arsenic, sulfur and tellurium were substantially removed from the bullion in which the antimony was recovered as shown in the table below. Thus, in effect, an unexpected refining action was also realized during the antimony recovery process.

TABLE

| Bullion | As % | Sb % | S % | Te % |
|---|---|---|---|---|
| Prior to Sb recovery | 0.0499 | 4.15 | 0.004 | 0.0102 |
| After Sb recovery | 0.0056 | 4.82 | 0.001 | 0.0007 |

This refining action during antimony recovery is believed to be primarily due to the sodium in the sodium-antimony intermetallic reacting with the arsenic, sulfur and tellurium in the bullion in preference to the water, thereby forming sodium compounds which accumulate in the residue dross and are skimmed.

From this example, the following observations are made:

(a) a substantially high antimony recovery can be realized by using this process; and (b) substantial amounts of arsenic, sulfur and tellurium can simultaneously be removed during the antimony recovery process.

EXAMPLE II

This example differs from Example I primarily in the use of sulfur instead of the water/charcoal combination for recovering antimony in the bullion from the refining drosses.

One hundred ninety-seven pounds of 3.08% antimony—0.0048% silver-lead bullion were heated to 850° F. Ninety-five pounds of refining dross containing 27% antimony and 0.01% silver were added and mixed into the bullion. Approximately 3 pounds of sulfur, as the stripping reagent, were added in small increments and mixed into the molten bullion. A typical residue dross, weighing 30 pounds (31.6% by weight of the initial refining dross) formed and was skimmed. Upon completion of the antimony recovery process, the final bullion weighed 262 pounds and had an antimony content of 10.78%, indicating an antimony recovery of 86%. Along with the antimony, a 90.5% silver recovery was also attained, resulting in the silver concentration in the final bullion to be 0.0069%. No bullion cleansing was required as the sodium content of the final bullion was less than 0.002%.

From this example, the following observation is made: lead bullion can be enriched to high antimony concentrations using this process without adversely affecting the recovery efficiency of antimony.

EXAMPLE III

In another experiment, sulfur and water were used together as the stripping reagents. Refining drosses from another lead refining operation, in which sodium was used as the refining reagent, were mixed into approximately 60 tons of 9.18% antimony-lead bullion at 850° F. The process was performed as above described in Example I except sulfur and water were used instead of the water/charcoal combination. Upon completion of the antimony recovery process, the antimony content of the enriched bullion was analyzed and found to be 11.17%. No detailed experimental data were recorded, thus exact antimony recovery calculations could not be made. However, knowing the source from which the refining drosses were generated, and the initial and final bullion analysis of this experiment, the antimony recovery was approximated to be in the range of 90 to 95%.

Along with the antimony, copper, nickel and tin were also recovered from the refining dross in the enriched bullion, while approximately 59% of the arsenic was removed from the bullion. These results are shown in the table below.

TABLE

| Bullion | As % | Cu % | Ni % | Sb % | Sn % |
| --- | --- | --- | --- | --- | --- |
| Prior to Sb Recovery | 0.2628 | 0.0762 | 0.0026 | 9.18 | 0.0616 |
| After Sb Recovery | 0.1086 | 0.1182 | 0.0033 | 11.17 | 0.1853 |

From the above discussion and examples, it may readily be seen that the present invention offers a novel and economical recovery process for lead bullion enrichment with antimony or other desired metal values and the removal of undesirable alloying elements. The process has the further advantage of being sufficiently flexible that, within a proper control range, the percentage of antimony recovered, when selected as the desired metal, can consistently be within the range of 70 to 90%, or more. The economics of the process resulting from materials and time savings also offers significant advantages in reducing the overall costs. In addition, significant savings are realized in labor costs as the result of using the process of the present invention instead of conventional antimony recovery processes.

We claim:

1. A process for metal-enrichment of lead bullion wherein an alkali metal-desired metal intermetallic is added to the bullion and said desired metal is stripped from said intermetallic into said bullion, comprising:
   (a) melting and heating said lead bullion to a temperature between 650° F. and 900° F.;
   (b) agitating said molten bullion;
   (c) adding said alkali metal-desired metal intermetallic in which said desired metal consists of a metal selected from the group comprising antimony, cadmium, copper, nickel, silver and tin to said bullion;
   (d) mixing said intermetallic into said bullion;
   (e) adding to said bullion a stripping reagent selected from the group comprising water, sulfur, selenium, tellurium, phosphorous, chlorine, air, oxygen-enriched air, nitre and mixtures thereof;
   (f) mixing said reagent into said bullion to selectively react said reagent with said alkali metal in said intermetallic and thereby dissociating said intermetallic, liberating and solubilizing said desired metal into said bullion and forming insoluble alkali metal-stripping reagent compounds which rise to form a skimmable residue dross;
   (g) forming said desired metal-enriched lead bullion and a residue dross substantially void of said desired metal; and
   (h) separating said residue dross from said enriched bullion.

2. The process set forth in claim 1, including the step of cleansing said enriched bullion of said alkali metal in solution by adding to and mixing into said enriched bullion a cleansing reagent.

3. The process set forth in claim 1 or 2, wherein said alkali metal-desired metal intermetallic is a sodium-desired metal intermetallic.

4. The process set forth in claim 1 or 2, wherein said alkali metal-desired metal intermetallic is an alkali metal-antimony intermetallic.

5. The process set forth in claim 1 or 2, wherein said alkali metal-desired metal intermetallic is a sodium-antimony intermetallic.

6. The process set forth in claim 1 or 2, wherein said stripping reagent is water.

7. The process set forth in claim 1 or 2, wherein said stripping reagent is sulfur.

8. The process set forth in claim 1 or 2, wherein said stripping reagent comprises a mixture of sulfur and water.

9. The process set forth in claim 2, wherein said cleansing reagent is selected from the group comprising air, oxygen-enriched air, water, nitre, sulfur, selenium, tellurium, phosphorus, chlorine and mixtures thereof.

10. The process set forth in claim 2, wherein said cleansing reagent is sulfur.

11. The process set forth in claim 1 or 2, wherein said alkali metal-desired metal intermetallic is contained in a lead refining dross.

12. A process for antimony-enrichment of lead bullion comprising:
   (a) melting and heating said lead bullion to a temperature between 650° F. and 900° F.;
   (b) agitating said molten bullion;
   (c) adding an alkali metal-antimony intermetallic to said bullion;
   (d) mixing said intermetallic into said bullion;
   (e) adding an antimony stripping reagent to said bullion;
   (f) mixing said reagent into said bullion to selectively react said reagent with said alkali metal of the alkali metal-antimony intermetallic, thereby dissociating said intermetallic, liberating and solubilizing said antimony into said bullion and forming insoluble alkali metal-stripping reagent compounds which rise to form a skimmable residue dross;
   (g) forming antimony enriched lead bullion and a residue dross substantially void of antimony; and
   (h) separating said residue dross from said enriched bullion.

13. The process set forth in claim 12, including the step of cleansing said antimony-enriched lead bullion of alkali metal in solution by adding to and mixing into said bullion a cleansing reagent.

14. The process set forth in claim 12 or 13, wherein said alkali metal-antimony intermetallic is a sodium-antimony intermetallic.

15. The process set forth in claim 12 or 13, wherein said antimony stripping agent is selected from the group comprising oxygen-enriched air, water, nitre, sulfur, selenium, tellurium, phosphorus, chlorine and mixtures thereof.

16. The process set forth in claim 12 or 13, wherein said stripping reagent is water.

17. The process set forth in claim 12 or 13, wherein said stripping reagent is sulfur.

18. The process set forth in claim 12 or 13 wherein said stripping reagent comprises a mixture of sulfur and water.

19. The process set forth in claim 13, wherein said cleansing reagent is selected from the group comprising air, oxygen-enriched air, water, sulfur, selenium, tellurium, phosphorus, chlorine and mixtures thereof.

20. The process set forth in claim 13, wherein said cleansing reagent is sulfur.

21. The process set forth in claim 12 or 13, wherein said alkali metal-antimony intermetallic is contained in a lead refining dross.

22. The process set forth in claim 14, wherein said alkali metal-antimony intermetallic is contained in a lead refining dross.

23. The process set forth in claim 1, 2, 12 or 13, wherein elements selected from the group comprising arsenic, sulfur, selenium and tellurium are removed from said bullion and are accumulated in said residue dross.

* * * * *